May 29, 1956 E. KAFIG 2,748,031

REPRODUCTION OF PRINTED PATTERNS BY VACUUM EVAPORATION

Filed Dec. 31, 1952

Emanuel Kafig, INVENTOR,

BY D. C. Snyder

ATTORNEY

United States Patent Office 2,748,031

Patented May 29, 1956

2,748,031

REPRODUCTION OF PRINTED PATTERNS BY VACUUM EVAPORATION

Emanuel Kafig, Silver Spring, Md.

Application December 31, 1952, Serial No. 329,155

8 Claims. (Cl. 117—212)

(Granted under Title 35, U. S. Code (1952), sec. 266)

The invention described herein may be manufactured and used by or for the Government of the United States of America for governmental purposes without the payment of any royalties thereon or therefor.

This invention pertains to the production of metallic coated articles or similar films or layers, especially in predetermined patterns, upon supporting surfaces.

It is frequently necessary, for technical purposes and also for ornamentation, to apply metallic films to supporting bases. For many applications, such as front surface mirrors, interference films and other special problems, this is best done by vacuum evaporation of the desired metal on to the surface of the supporting body. Also it is occasionally necessary or desirable to produce the metallic film coating in a predetermined pattern. Conventionally, masking the portions of the supporting surface which are not to be coated has been employed to produce such patterns, but this is often unsatisfactory. For example, unless the mask is in perfect contact with the supporting body, the edges of the pattern will not be sharp. Also, and especially for relatively complicated patterns, the masking is tedious and expensive, especially for mass production. Finally, where the pattern includes completely cut out areas (which are not supported by the edge) a single mask cannot be used.

The present invention provides a process or method for the rapid and relatively economical production of printed metallic patterns upon a supporting base, and which is not subject to the above limitations. Briefly, the novel process consists in applying to the supporting body (which is to be coated) a negative pattern comprising a material which is soluble in a liquid which will not attack the metal of which the final pattern is to be formed. The entire surface of the body is then subjected to conventional vacuum evaporation of the metal which is to form the final pattern, and thereafter the parts of the evaporated layer which overlie the soluble material are removed by applying the solvent liquid to the coated surface. Depending upon the nature of the soluble material, the removal process may be hastened by a gentle wiping action. Since the vacuum evaporating metal will adhere tenaciously to those portions of the supporting body which were not protected by the soluble material constituting the negative image of the pattern, the final metallic pattern will be accurate and sharp edged throughout.

Figure 1:
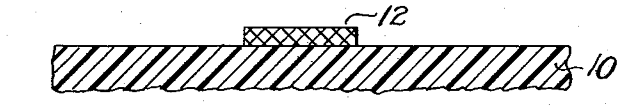
Figure 2:
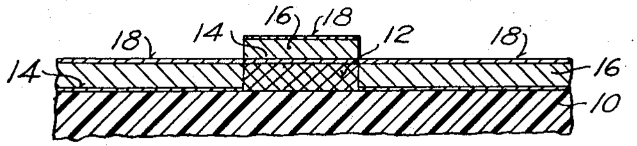
Figure 3:
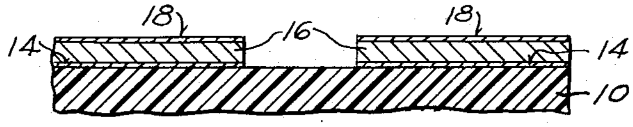
Figure 4:
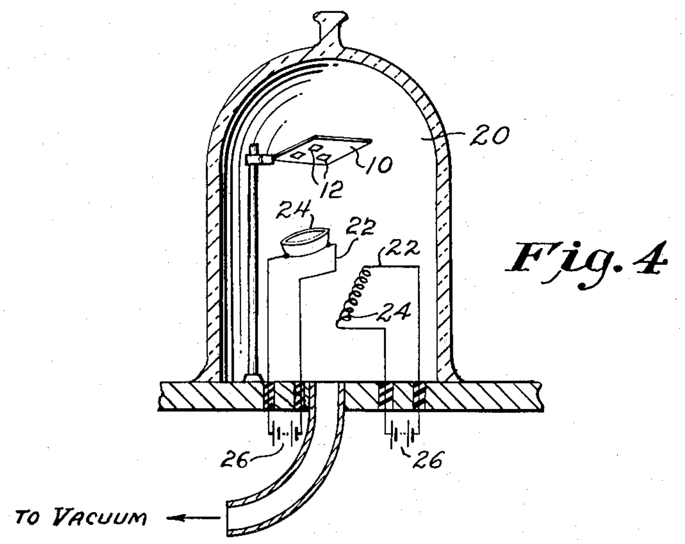

The process of the invention will best be understood by referring to the following detailed specification of certain preferred embodiments thereof, taken in connection with the appended drawings, in which:

Fig. 1 is a sectional view showing a portion of a non-metallic supporting body to which a pattern of soluble material has been applied as the first step in the process, Fig. 2 is a similar view showing the body after the application to its entire surface of a series of layers including a principal layer of the metal which is to form the pattern, Fig. 3 is a similar view showing the article after selective removal of the undesired portions of the evaporated layers, and Fig. 4 is a sectional schematic view illustrating a known arrangement for vacuum evaporation of the metallic layer or layers upon the article.

Referring now to the drawing, numeral 10 designates a supporting body shown as of plastic. The body or article 10 may be in sheet form, or it may be a relatively solid object which is desired to be provided with a pattern configuration of metal upon its surface. Obviously, the body 10 need not be a plastic material, but it may be any material which will accept evaporating metals, including glass, or other ceramics, metal, paper, tracing cloth or photographic paper.

In a first example of the process, which is illustrated in the drawings, a negative or inverse drawing of the desired pattern configuration is first made, upon paper or other suitable material. This drawing is used as the master from which a conventional printer's zinc printing plate is made. Manual etching or photo-etch processes may be used to produce this printing plate, which is inked in the usual way (that is, with ordinary printer's ink) and the ink pattern printed upon the body 10 in the usual way by pressure contact.

In Fig. 1, a portion of the negative pattern in printer's ink is designated by the area 12. For clarity, the thickness of this pattern area is exaggerated, or the drawing may be thought of as highly magnified cross-sectional views. The article or body 10 bearing the negative pattern in printer's ink, is then subjected to vacuum evaporation in the manner indicated in Fig. 4, which will be described below. Preferably, the entire surface of the ink-printed body 10 is first given vacuum evaporated coating 14 of silicon monoxide, the thickness of the coating being about 800 Angstrom units (A). If desired, the article may be subjected to a preliminary high voltage glow discharge, say at 2500 volts and 100 milliamperes for 4 minutes, followed by the rapid evaporation of the silicon monoxide coating 14. The technique of this part of the process is described in an article by G. Hass, in the Journal of the American Ceramic Society, vol. 33, pages 353–360 (1950).

The function of the silicon monoxide layer 14 is to increase the adherence of the subsequent aluminum layer 16 which is also to be vacuum evaporated over the entire surface of the article 10, or at least the general area thereof which is to carry the final pattern. The aluminum layer 16 is to be rapidly evaporated (for a time of about 30 seconds) to a thickness of from 1000 to 1500 A. Following this, a final silicon monoxide layer 18 is applied over the entire surface which is to bear the pattern. This final layer 18 may be applied in the same way as described above with reference to the layer 14, and the function of this final layer is to render the aluminum more resistant to abrasion and corrosion.

Following the evaporation steps, the sheet or article 10 is removed from the vacuum chamber and subjected to or submerged in a solution which is a solvent for the printer's ink, but will not attack the evaporated layers themselves. Since the evaporated layers are at least slightly permeable to the solvent, the parts of the pattern lying above the spots or areas bearing printer's ink are readily removed, especially if the surface is gently wiped as with a tuft of cotton or the like. A suitable solvent for printer's ink may be made by adding to white gasoline approximately 10 per cent of carbon tetrachloride.

The final product is as illustrated in Fig. 3, in which the body 10 bears the desired (positive) pattern formed principally by the aluminum layer 16.

Fig. 4 illustrates schematically a suitable apparatus for carrying out the evaporation technique, the article or body 10 having the negative pattern spots 12 thereon, and being suitably supported within a vacuum chamber indicated as a bell jar 20. A ribbon or the like 22 represents the metal (such as aluminum) or the silicon monoxide to be evaporated, the same being heated to the necessary temperature as by a heating coil 24 energized from a current source represented by the battery 26. The degree of vacuum may be of the order of $10^{-4}$ millimeters of mercury.

In place of the printer's ink described above, printing, drawing or painting of the pattern negative upon the article 10 may be accomplished with water-soluble inks or dyes in place of the oil-base printing ink. When such water-soluble materials are used, removal of the evaporated layers in the desired pattern occurs spontaneously upon immersion of the specimen in water. Obviously, any suitable material may be used in place of the ink protective material 12, so long as it is readily soluble in some liquid which will not attack the metallic portions which are intended to remain upon the treated article.

Where the pattern to be applied consists of a large number of repetitious or identical areas, the original negative drawing and/or the printer's plate may include only a fraction of the entire area, the complete design or ink or similar material being applied to the article 10 by repeated printings as in the well-known step-and-repeat process of printing plate production. In one application, where it was desired to render some 20,000 spots (upon a radiometer surface) reflective to infrared radiation, several hundred spots were drawn in negative pattern, and a single printer's plate made therefrom and used to imprint the ink upon sheets of "Scotch-Weld" film, this material being a bonding film, No. 580, as manufactured by the Minnesota Mining and Manufacturing Company, St. Paul, Minnesota. The final article had these plastic sheets adhered thereto, after they had been treated as above to obtain the desired pattern of aluminum spots. Adhesion was readily obtained by the use of moderate heat and pressure, and the "Scotch-Weld" supporting layer provided electrical insulation between the aluminum spots and the underlying electrical components, which in this instance consisted of thermocouple junctions.

The above examples specify metal as the material 16 which is insoluble in the solvent for the material 12. However, since other materials than metal can be evaporated in the vacuum process, the choice of the pattern material is not restricted to metals, but includes any vaporizable material, so long as a liquid is available which will not attack the pattern material 16 but will dissolve or remove the soluble material 12. The term "soluble" and "insoluble" as used herein are intended to be interpreted in this relative sense.

The invention has been described in connection with certain examples of procedures and materials, but it will be obvious to those skilled in the art that it may readily be caried out with equivalent materials and may include additional refinements as desired for particular applications. The invention is therefore not intended to be limited by the above examples, except in so far as may be required by the scope of the appended claims.

I claim:

1. The process of producing a pattern of metallic areas upon a supporting base material, comprising the steps of applying a layer of a soluble substance having a configuration which is the negative of the desired pattern, depositing by vapor deposition of a layer of silicon monoxide on the surface of the base material, retaining in vacuo said supporting base material having thereon said aforementioned layer of silicon monoxide to prevent oxidation of said silicon monoxide, depositing by vapor deposition upon the second mentioned layer of an overall layer of the desired metal, covering the entire layered area with a second layer of silicon monoxide, and removing the layer of soluble substance and those portions of metal overlying said soluble substance by the action of a liquid solvent applied thereto.

2. The process in accordance with claim 1, including the step of subjecting the coated surface to the action of said solvent while mechanicaly wiping said surface to aid in the removal of the undesired portions of metallic material.

3. The process in accordance with claim 1, in which the second layer of silicon monoxide is vapor deposited on the metal in a vacuum.

4. The process in accordance with claim 1, including the step of subjecting the supporting base material to a high voltage glow discharge prior to the application of the first layer of silicon monoxide to said base material.

5. A coated article having a plurality of spaced metallic junctions comprising a supporting non-metallic body having an outer surface, a layer of silicon monoxide on said outer surface, a pattern of metallic areas vapor deposited on said layer and an overall covering layer of silicon monoxide on said surface.

6. A coated article comprising a non-metallic body, a layer of silicon monoxide on said body, a plurality of spaced metallic areas in engagement with said silicon monoxide layer, and a second layer of silicon monoxide in overlayered engagement with said metallic areas.

7. A coated article comprising a non-metallic body, a layer of silicon monoxide on said body, a pattern of spaced metallic areas on said layer, and a second layer of silicon monoxide vapor deposited on said metallic areas in inter-mingled relationship therewith.

8. A method of applying a metallic pattern to an article which comprises the steps of applying to said article firstly an ink negative of the desired said pattern, said ink being composed of a material soluble in a liquid solvent to which said metallic pattern is chemically inert, placing said article in vacuo, applying to said article secondly by vacuum evaporation a layer of silicon monoxide, retaining said article in vacuo to avoid oxidation of said applied silicon monoxide layer, applying to said article thirdly by vacuum evaporation a layer of metal, said metallic layer being of greater thickness than said layer of silicon monoxide, applying to said article fourthly by vacuum evaporation again a layer of silicon monoxide, and lastly applying said liquid solvent to said article to remove said ink negative, thereby removing therewith redundant areas of said secondly applied layer of silicon monoxide, of said thirdly applied layer of metal, and of said fourthly applied layer of silicon monoxide.

References Cited in the file of this patent

UNITED STATES PATENTS

| | | |
|---|---|---|
| 2,107,784 | Gardner | Feb. 8, 1938 |
| 2,139,640 | Mall et al. | Dec. 6, 1938 |
| 2,304,182 | Lang | Dec. 8, 1942 |
| 2,373,639 | Turner | Apr. 10, 1945 |
| 2,386,876 | Ogle et al. | Oct. 16, 1945 |
| 2,441,960 | Eisler | May 25, 1948 |
| 2,447,836 | Beeber et al. | Aug. 24, 1948 |
| 2,456,899 | Strong | Dec. 21, 1948 |
| 2,628,921 | Weinrich | Feb. 17, 1953 |